United States Patent
Laiou et al.

(10) Patent No.: US 8,027,774 B2
(45) Date of Patent: Sep. 27, 2011

(54) METHOD AND DEVICE FOR ENSURING THE STANDSTILL OF A MOTOR VEHICLE

(75) Inventors: Maria-Christina Laiou, Munich (DE); Falk Langer, Marienberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 969 days.

(21) Appl. No.: 11/945,356

(22) Filed: Nov. 27, 2007

(65) Prior Publication Data

US 2008/0133099 A1 Jun. 5, 2008

(30) Foreign Application Priority Data

Nov. 30, 2006 (DE) .......................... 10 2006 056 627

(51) Int. Cl.
 *G08G 1/16* (2006.01)
 *G06F 19/00* (2006.01)
(52) U.S. Cl. ............... 701/70; 701/78; 701/301; 701/96
(58) Field of Classification Search .................... 701/70, 701/301, 76, 78, 96, 97
 See application file for complete search history.

(56) References Cited

U.S. PATENT DOCUMENTS

| | | | | |
|---|---|---|---|---|
| 4,717,207 A * | 1/1988 | Kubota et al. | ...................... | 303/3 |
| 5,129,496 A * | 7/1992 | Sigl et al. | .................... | 192/49 |
| 6,260,934 B1 * | 7/2001 | Lee | ................. | 303/192 |
| 6,370,466 B1 * | 4/2002 | Hada et al. | ...................... | 701/70 |
| 6,428,120 B1 * | 8/2002 | Holl | ............................ | 303/191 |
| 6,776,036 B2 | 8/2004 | Straight et al. | | |
| 6,994,407 B2 * | 2/2006 | Kinder et al. | ................ | 303/191 |
| 7,184,874 B2 * | 2/2007 | Michi et al. | ..................... | 701/96 |
| 7,627,415 B2 * | 12/2009 | Tschernoster et al. | ........ | 701/96 |
| 2003/0214185 A1 * | 11/2003 | Kinder et al. | ................ | 303/192 |
| 2005/0038591 A1 * | 2/2005 | Michi et al. | .................... | 701/96 |
| 2005/0143890 A1 * | 6/2005 | Minowa et al. | ................. | 701/70 |
| 2006/0052926 A1 * | 3/2006 | Okada et al. | .................... | 701/51 |
| 2007/0100530 A1 * | 5/2007 | Mori et al. | ........................ | 701/70 |
| 2008/0215224 A1 * | 9/2008 | Tschernoster et al. | ......... | 701/96 |

FOREIGN PATENT DOCUMENTS

| | | |
|---|---|---|
| DE | 100 63 063 A1 | 6/2002 |
| DE | 101 52 632 A1 | 5/2003 |
| DE | 102 42 813 A1 | 6/2004 |
| DE | 10 2005 021 492 A1 | 11/2006 |
| DE | 10 2005 023 364 A1 | 11/2006 |
| DE | 10 2005 036 217 A1 | 2/2007 |

OTHER PUBLICATIONS

German Search Report dated Jun. 13, 2007 with English translation of relevant portion (Nine (9) pages).

\* cited by examiner

*Primary Examiner* — Khoi Tran
*Assistant Examiner* — Jason Holloway
(74) *Attorney, Agent, or Firm* — Crowell & Moring LLP

(57) ABSTRACT

A method ensures the standstill of a motor vehicle. Before reaching the standstill, an electronic control unit checks whether a predefined inclination threshold is exceeded, whether the velocity has fallen below a predefined travel velocity threshold, and whether there is a negative vehicle acceleration. If all three conditions exist simultaneously, an increased setpoint braking torque is predefined until the motor vehicle reaches the standstill.

9 Claims, 1 Drawing Sheet

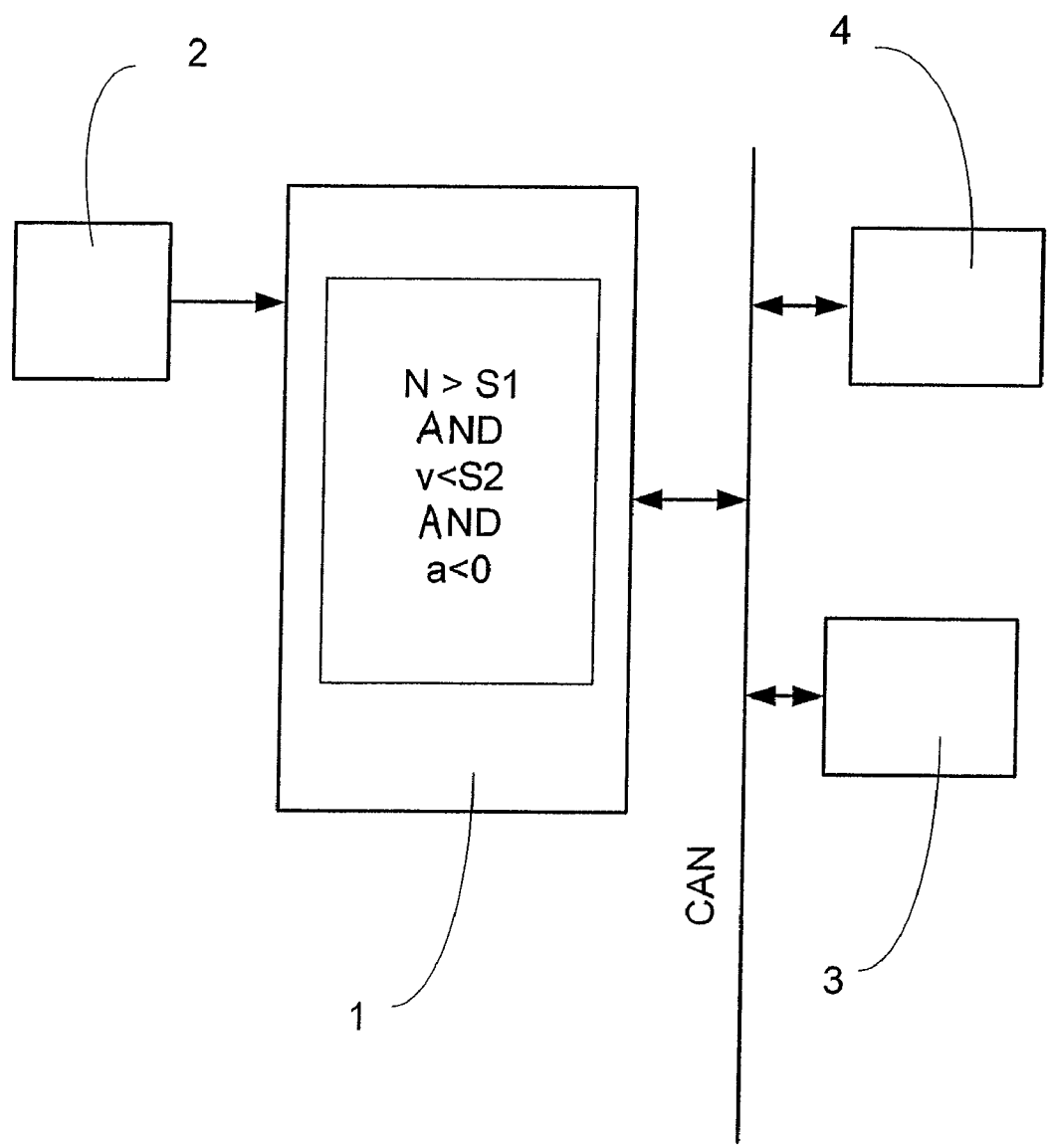

METHOD AND DEVICE FOR ENSURING THE STANDSTILL OF A MOTOR VEHICLE

BACKGROUND AND SUMMARY OF THE INVENTION

This application claims the priority of German Application No. 10 2006 056 627.0, filed Nov. 30, 2006, the disclosure of which is expressly incorporated by reference herein.

The present invention relates to a method and a device for ensuring the standstill of a motor vehicle using at least one electronic control unit, by which the motor vehicle is braked down to a standstill while maintaining a specific distance to a target object.

Vehicles which have a speed (velocity) regulator utilizing distance sensors are already on the market. Such a vehicle attempts to maintain a predefinable driving speed, in particular during travel on a freeway or an expressway, but reduces this speed when this vehicle approaches a leading vehicle (target object). Extremely comfortable driving in column traffic is thus made possible for the vehicle driver, because the speed regulator having distance sensors (e.g., a so-called ACC "Adaptive/Active Cruise Control") always maintains a sufficient safety distance to the "man in front." If the lead vehicle accelerates, the speed regulator having distance sensors (also referred to as "ACC system" in the following) thus also accelerates the vehicle equipped therewith, until reaching the set desired speed or the speed of the lead vehicle, if the lead vehicle travels more slower than the desired velocity.

Reference is made to German patent document DE 101 52 632 A1 on the technical background, for example.

As a supplement to ACC systems, which are predominantly operated in a high speed range on well-structured roads, so-called stop & go systems, which allow for comparable driver support, in particular in the low velocity range down to standstill of the vehicle, are also known. In addition to high-performance close range sensors, these systems require an electronically activatable braking system, which is capable of reliably holding the vehicle in a stoppage phase and preventing further rolling until the driver of the vehicle or the stop & go system itself has given a corresponding command to start (start command).

An important function of an ACC stop & go system is the automatic stopping and secure retention of the vehicle at a standstill. Above all, if the vehicle is located on an incline, it is very important that (undesired) rolling backward of the vehicle is prevented.

A distance-related speed regulation system having a stop & go function, which particularly ensures the stoppage of the vehicle even with a predominantly level roadway, is described, for example, in German patent application 10 2005 036 217 (no prior publication).

An improved distance-related speed regulation system of the above type having a stop and go function is needed, in particular, for maintaining a standstill when stopping on hills.

The present invention provides a method for ensuring the standstill of a motor vehicle using at least one electronic control unit, by which the motor vehicle is braked down to a standstill while maintaining a specific distance to a target object. Before reaching the standstill, it is checked by the control unit, whether a predefined inclination threshold (N>S1) is exceeded, whether the velocity has fallen below a predefined travel velocity threshold (v<S2), and whether a negative vehicle acceleration (a<0) exists. If these conditions exist simultaneously, an increased setpoint braking torque is predefined by the control unit until the standstill of the vehicle is reached. Advantageous refinements of the invention are described and claimed herein.

From a specific incline, the stopping is prepared if the following two conditions are additionally fulfilled: (a) the vehicle velocity falls below a (preferably incline-dependent) threshold, and (b) the vehicle acceleration is negative (deceleration).

The present invention is based on the following findings.

To prepare for stopping, the brake is activated in such a way that secure retention of the vehicle is achieved. The background is as follows: regulated stopping uphill would normally be achieved by activating the drive, as also according to German patent application 10 2005 036 217, for example. This means that the vehicle would come to a standstill having a braking torque of zero [Nm]. According to German patent application 10 2005 036 217, the brake would then be activated to build up an (incline-dependent) safety reserve, which is necessary to retain the vehicle at a standstill uphill. Because the brake control unit requires a certain time until pressure is built up and the braking torque requested by ACC stop & go is available, the vehicle may roll backward unintentionally shortly after stopping. The stopping on the hill is "predicted" and correspondingly prepared for by the present invention. The ACC stop & go requests a braking torque already shortly before the stopping and the brakes may react more rapidly to the increased demand at a stop.

The instantaneous inclination at which the vehicle is located is calculated, for example, from the difference between the current value of the signal, which the longitudinal acceleration sensor provides, and the current value of the vehicle longitudinal acceleration, which is produced from the wheel speed sensors. Because this signal oscillates strongly during the transition from travel to standstill, this signal is preferably filtered by a low-pass filter.

Other objects, advantages and novel features of the present invention will become apparent from the following detailed description of the invention when considered in conjunction with the accompanying drawings.

BRIEF DESCRIPTION OF THE DRAWING

The single FIGURE is an exemplary schematic block diagram of a device for performing the method according to the present invention.

DETAILED DESCRIPTION OF THE DRAWING

Referring to the FIGURE, the device for ensuring the standstill of a motor vehicle has a distance-related longitudinal dynamic regulating module 1 contained in a first electronic control unit, which is connected to distance sensors 2, and by which the vehicle may be braked down to a standstill while maintaining a specific distance to a target object. To maintain a specific distance or a predefined vehicle velocity, the longitudinal dynamic regulating module 1 outputs a setpoint acceleration in a known way, for example, which is in turn converted into a setpoint drive torque and/or a setpoint braking torque, related to wheel torques, for example. The setpoint drive torque is transmitted from the longitudinal dynamic regulating module 1 via a data bus connection (e.g., CAN) to a drive control unit 4 for controlling the drive motor and possibly a transmission, for example. The setpoint braking torque is transmitted from the longitudinal dynamic regulating module 1, also via a data bus connection CAN, for example, to a brake regulating module 3 for controlling a brake regulating system (ASC or DSC braking system (from BMW, for example) or parking brake).

Fundamental regulated variables for the setpoint drive torque and the setpoint braking torque are calculated in the longitudinal dynamic regulating module 1 as a function of the distance of the target object in stop & go operation.

These regulated variables may be ignored during standstill management according to the method for controlling the drive torque and the braking torque according to German patent application 10 2005 036 217, for example; because after recognizing the standstill of the motor vehicle, a transfer signal may be transmitted from the longitudinal dynamic regulating module 1 to the brake regulating module 3, upon which the brake regulating module 3 automatically builds up and/or retains a wheel braking torque in accordance with a parking brake function independently of the preset of a setpoint braking torque by the longitudinal dynamic regulating module 1.

As long as no hill travel, i.e., no incline is recognized, the method is preferably performed according to German patent application 10 2005 036 217, which is incorporated by reference herein.

According to the present invention, the longitudinal dynamic regulating module 1 checks, before reaching the standstill, whether a predefined inclination threshold is exceeded, whether the velocity has fallen below a predefined driving velocity threshold, and whether there is negative vehicle acceleration (deceleration). If all three conditions exist simultaneously, an increased setpoint braking torque is predefined by the longitudinal dynamic regulating module 1 for the brake regulating module 3 until reaching the standstill of the vehicle. Increased setpoint braking torque is to be understood as a braking torque which is greater than the control-technology setpoint braking torque just required for the typical regulation of a setpoint velocity or a setpoint distance. According to the prior art, this control-technology setpoint braking torque may also be zero for the typical regulation in the event of stopping on an incline. Starting from an increased setpoint braking torque in comparison thereto according to the present invention, a ramped further braking torque increase in the meaning of a safety setpoint braking torque or the build up of a safety setpoint braking torque may be performed after reaching a standstill, for example. A possible procedure for building up a safety setpoint braking torque is also described, for example, in German patent application 10 2005 036 217.

In a preferred refinement of the present invention, upon recognizing a (slight) roll backward in spite of increased setpoint braking torque after reaching a standstill, the gradient for the further braking torque increase (e.g., steeper ramp) is additionally increased, so that the safety setpoint braking torque calculated for ensuring the standstill is reached more rapidly. This gradient increase until reaching a safety supply braking torque calculated for ensuring a standstill, when rolling backward is recognized after a standstill is reached (in any way), may be performed not only as a refinement of the present invention, but rather also as an independent measure, for example, also by a brake control unit.

Rolling backward may be recognized, for example, using the travel velocity and/or wheel speed sensors present in the vehicle in any case. A negative travel velocity may also be ascertained from a travel velocity "v" produced via the wheel speed sensors and a sensor or algorithm reflecting the travel direction. Rolling backward is preferably recognized if the velocity falls below a negative travel velocity threshold (e.g., light rolling backward, if v<−0.5 km/h or stronger rolling backward if v<−1 km/h).

If, in spite of the above-mentioned measure of the gradient increase, rolling backward or even stronger rolling backward is recognized, in a further advantageous design of the present invention, the setpoint braking torque is increased until the travel velocity zero is reached. The setpoint braking torque thus calculated may be stored as a new safety setpoint braking torque, because the original or earlier safety setpoint braking torque has thus been recognized as inadequate. The cause of this may be a maladjusted sensor, for example. This preferably continuous setpoint braking torque increase until reaching the travel velocity zero, when rolling backward is recognized after a standstill is reached (in any way), may also be performed not only as a refinement of the present invention, but rather also as an independent measure, for example, also by a brake control unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for ensuring a standstill of a motor vehicle having at least one electronic control unit by which the motor vehicle is braked down to a standstill while maintaining a specific distance to a target object, the method comprising the acts of: prior to reaching the standstill, determining by the control unit whether a predefined inclination threshold is exceeded; prior to reaching the standstill, determining by the control unit whether a velocity of the motor vehicle has fallen below a predefined travel velocity threshold; prior to reaching the standstill, determining by the control unit whether a negative vehicle acceleration of the motor vehicle is occurring; and predefining by the control unit an increased set point braking torque until the standstill of the vehicle is reached when the exceeding of the predefined inclination threshold, the falling below of the predefined travel velocity threshold, and the negative vehicle acceleration exist simultaneously, and wherein the increased set point braking torque is greater than a control-technology setpoint braking torque just required for typical regulation of a setpoint velocity or a setpoint distance, and wherein the increased set point braking torque is applied, by a brake regulation module to account for an increased demand on the motor vehicle's braking system at the standstill.

2. The method according to claim 1, the method further comprising the acts of:
following the predefining of the increased set point braking torque by the control unit, determining whether a rolling backward of the motor vehicle is occurring; and
additionally increasing a gradient for a further braking torque build-up when the rolling backward is recognized.

3. The method according to claim 1, further comprising the acts of:
following the predefining of the increased set point braking torque by the control unit, determining whether a rolling backward of the motor vehicle is occurring; and
further increasing the set point braking torque until a travel velocity of zero is reached.

4. The method according to claim 2, further comprising the acts of:
following the predefining of the increased set point braking torque by the control unit, determining whether a rolling backward of the motor vehicle is occurring; and further increasing the set point braking torque until a travel velocity of zero is reached.

5. A device for ensuring a standstill of a motor vehicle while maintaining a specific distance to a target object, the device comprising: means for determining whether a predefined inclination threshold is exceeded; means for determining whether a velocity of the motor vehicle has fallen below a predefined travel velocity threshold; means for determining an existence of a negative vehicle acceleration; and means for predefining an increased set point braking torque until a standstill of the vehicle is reached when the predefined inclination threshold is exceeded, the velocity has fallen below the predefined travel velocity threshold, and there is a negative vehicle acceleration, and wherein the increased set point braking torque is greater than a control-technology setpoint braking torque just required for typical regulation of a setpoint velocity or a setpoint distance, and wherein the increased set point braking torque is applied, by a brake regulation module to account for an increased demand on the motor vehicle's braking system at the standstill.

6. A device for performing the method according to claim 1, the device comprising:
a control unit operatively coupled via other control units to at least one travel velocity sensor, an inclination sensor, a longitudinal acceleration sensor, and an electronically controllable braking system.

7. The method according to claim 1, wherein said predefining comprises predefining, by the control unit, the increased set point braking torque such that the specific distance to the target object is maintained until the standstill of the vehicle is reached.

8. The device according to claim 5, the device further comprising:
means for determining, after said predefining of the increased set point braking torque and after the motor vehicle reaches said standstill, whether a rolling backward of the motor vehicle is occurring; and
means for additionally increasing a gradient for a further braking torque build-up when the rolling backward is recognized.

9. The device according to claim 5, wherein the means for predefining further comprises means for predefining the increased set point braking torque such that the specific distance to the target object is maintained until the standstill of the vehicle is reached.

* * * * *